United States Patent
Larson (10) Patent No.: US 12,424,368 B2
(45) Date of Patent: Sep. 23, 2025

(54) HAPTIC ACTUATOR

(71) Applicant: Apple Inc., Cupertino, CA (US)

(72) Inventor: Nils E. Larson, San Jose, CA (US)

(73) Assignee: APPLE INC., Cupertino, CA (US)

( * ) Notice: Subject to any disclaimer, the term of this patent is extended or adjusted under 35 U.S.C. 154(b) by 148 days.

(21) Appl. No.: 18/201,397

(22) Filed: May 24, 2023

(65) Prior Publication Data

US 2023/0298794 A1 Sep. 21, 2023

Related U.S. Application Data

(63) Continuation of application No. 16/935,580, filed on Jul. 22, 2020, now Pat. No. 11,694,831.

(60) Provisional application No. 62/904,569, filed on Sep. 23, 2019.

(51) Int. Cl.
| | |
|---|---|
| *H01F 7/129* | (2006.01) |
| *G08B 6/00* | (2006.01) |
| *H01F 7/08* | (2006.01) |
| *H01F 7/127* | (2006.01) |

(52) U.S. Cl.
CPC .............. *H01F 7/129* (2013.01); *G08B 6/00* (2013.01); *H01F 7/081* (2013.01); *H01F 7/127* (2013.01)

(58) Field of Classification Search
CPC ............ G08B 6/00; H01F 7/081; H01F 7/127
USPC ...................................................... 340/407.1
See application file for complete search history.

(56) References Cited

U.S. PATENT DOCUMENTS

| | | | |
|---|---|---|---|
| 6,075,359 A | 6/2000 | Van Fleet, III | |
| 8,169,402 B2 | 5/2012 | Shahoian et al. | |
| 2009/0050809 A1* | 2/2009 | Holec | G01F 1/7086 |
| | | | 250/343 |
| 2010/0213773 A1 | 8/2010 | Dong et al. | |
| 2011/0291947 A1* | 12/2011 | Pemberton-Pigott | ....................... |
| | | | G06F 1/1643 |
| | | | 345/173 |
| 2012/0049660 A1 | 3/2012 | Park | |
| 2012/0169151 A1 | 7/2012 | Dong | |
| 2014/0197936 A1 | 7/2014 | Biggs | |
| 2014/0370366 A1* | 12/2014 | Higuchi | H01M 50/566 |
| | | | 429/158 |
| 2015/0080660 A1* | 3/2015 | Gomez | A61B 1/3132 |
| | | | 600/157 |

(Continued)

FOREIGN PATENT DOCUMENTS

| | | |
|---|---|---|
| WO | WO 13/169299 | 11/2013 |
| WO | WO 13/169303 | 11/2013 |

(Continued)

OTHER PUBLICATIONS

Product Specification Sheet, Geeplus, VIBRO1 Vibration Actuator, 2 pages, www.geeplus.biz, downloaded on Jul. 15, 2015.

*Primary Examiner* — Jack K Wang
(74) *Attorney, Agent, or Firm* — Brownstein Hyatt Farber Schreck, LLP (57) ABSTRACT

A haptic actuator may include a housing that includes first and second shells. The first shell may define a first tab and the second shell may define a second tab. The housing may also include a plastic end portion positioned between the first and second shells. The plastic end portion may define recesses that receive the first and second tabs. At least one coil may be carried by the housing. A field member may be movable within the housing responsive to the at least one coil. A flexure may be coupled to the plastic end portion and the field member.

20 Claims, 8 Drawing Sheets

(56) References Cited

U.S. PATENT DOCUMENTS

| | | | |
|---|---|---|---|
| 2015/0109223 A1 | 4/2015 | Kessler et al. | |
| 2015/0116205 A1 | 4/2015 | Westerman et al. | |
| 2015/0130730 A1 | 5/2015 | Harley et al. | |
| 2015/0318634 A1 | 11/2015 | Henry et al. | |
| 2017/0039824 A1 | 2/2017 | Hajati | |
| 2017/0285747 A1 | 10/2017 | Chen | |
| 2018/0364806 A1 | 12/2018 | El-Ouardi et al. | |
| 2019/0363607 A1* | 11/2019 | Guntermann | F04B 39/121 |
| 2020/0139816 A1 | 5/2020 | Carvalho | |
| 2020/0209968 A1 | 7/2020 | Larson | |
| 2021/0095964 A1* | 4/2021 | Yin | G01C 25/00 |
| 2021/0294443 A1 | 9/2021 | Kim | |
| 2021/0312770 A1* | 10/2021 | Nakao | H02N 2/04 |

FOREIGN PATENT DOCUMENTS

| | | |
|---|---|---|
| WO | WO 13/169305 | 11/2013 |
| WO | WO 13/170099 | 11/2013 |
| WO | WO 13/188307 | 12/2013 |
| WO | WO 14/018111 | 1/2014 |
| WO | WO 15/020663 | 2/2015 |

* cited by examiner

HAPTIC ACTUATOR

CROSS-REFERENCE TO RELATED APPLICATIONS

The present application is a continuation of U.S. patent application Ser. No. 16/935,580, filed Jul. 22, 2020, which claims the priority benefit of U.S. Provisional Patent Application No. 62/904,569, filed Sep. 23, 2019, the entire contents of which are herein incorporated by reference as if fully disclosed herein.

TECHNICAL FIELD

The present disclosure relates to the field of electronics, and, more particularly, to the field of haptics.

BACKGROUND

Haptic technology is becoming a more popular way of conveying information to a user. Haptic technology, which may simply be referred to as haptics, is a tactile feedback based technology that stimulates a user's sense of touch by imparting relative amounts of force to the user.

A haptic device or haptic actuator is an example of a device that provides the tactile feedback to the user. In particular, the haptic device or actuator may apply relative amounts of force to a user through actuation of a mass that is part of the haptic device. Through various forms of tactile feedback, for example, generated relatively long and short bursts of force or vibrations, information may be conveyed to the user.

SUMMARY

A haptic actuator may include a housing that includes first and second shells coupled together. The first shell may include a first body and a first plurality of terminals extending outwardly therefrom. The second shell may include a second body and a second plurality of terminals extending outwardly therefrom with each of the second plurality of terminals being secured with a respective one of the first plurality of terminals defining pairs of first and second secured-together terminals. The haptic actuator may also include at least one coil carried by the housing and a field member movable within the housing responsive to the at least one coil. A respective flexure may be between adjacent end portions of the housing and the field member.

The haptic actuator may also include a respective welded joint securing each pair of first and second secured-together terminals. The first and second respective terminals of each pair of secured-together terminals may be coextensive, for example.

Each of the plurality of first and second terminals may have a fastener receiving passageway therein. The field member may include a frame having opposing first and second ends and first and second overmolded endcaps coupled to the first and second ends of the frame, respectively, for example.

The haptic actuator may also include a respective plastic body between each respective flexure and adjacent end portions of the housing, for example. The field member may include a frame and at least one permanent magnet carried by the frame.

The housing may include a magnetic material. The flexures may have a wishbone shape, for example. The at least one coil may have a loop shape, for example.

A method aspect is directed to a method of making a haptic actuator that may include coupling first and second shells of a housing together. The first shell may include a first body and a first plurality of terminals extending outwardly therefrom. The second shell may include a second body and a second plurality of terminals extending outwardly therefrom. The first and second shells may be coupled so that each of the second plurality of terminals being secured with a respective one of the first plurality of terminals define pairs of first and second secured-together terminals. The method may also include positioning at least one coil carried by the housing and positioning a field member to be movable within the housing responsive to the at least one coil. The method may further include positioning a respective flexure between adjacent end portions of the housing and the field member.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
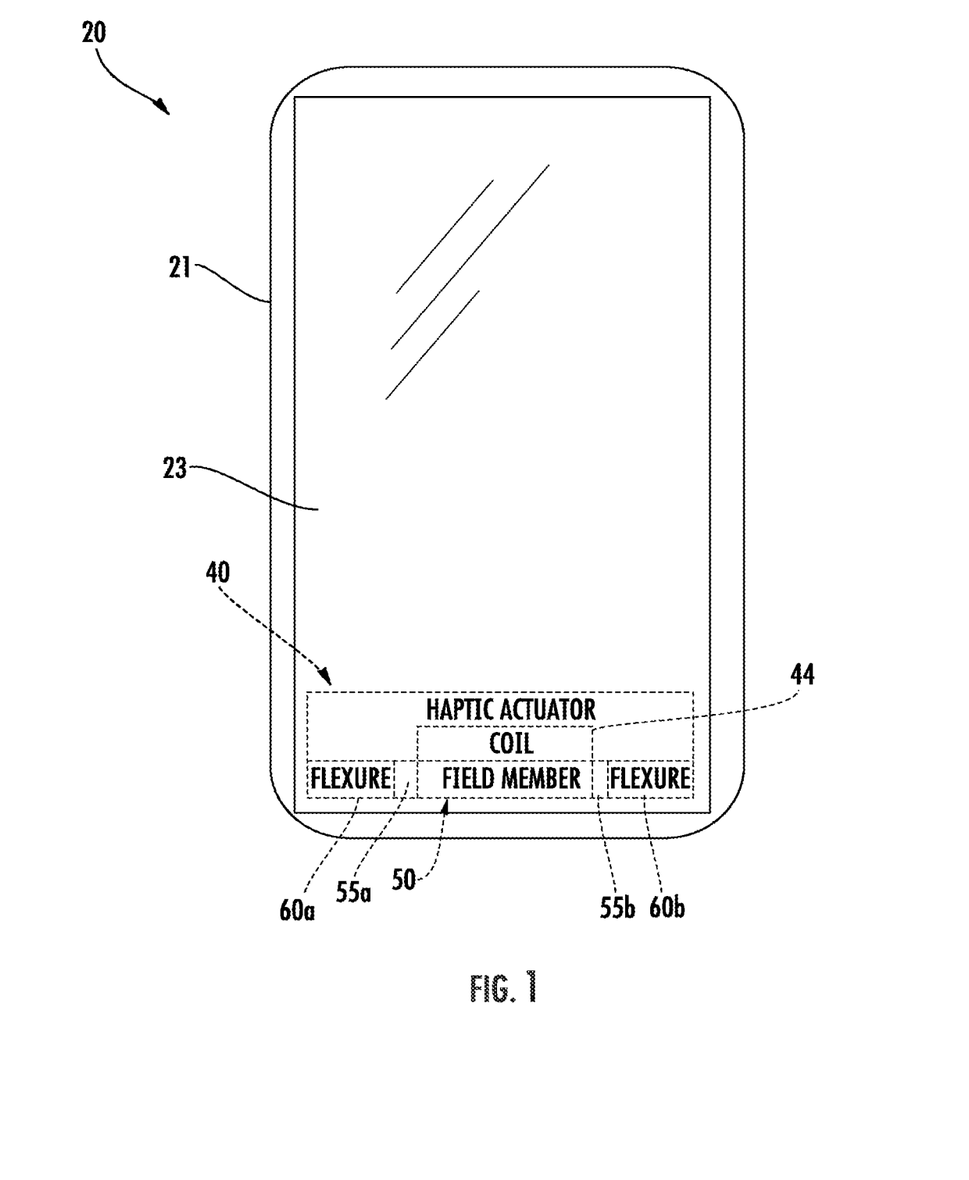
FIG. 1 is a schematic diagram of an electronic device in accordance with an embodiment.
Figure 2:
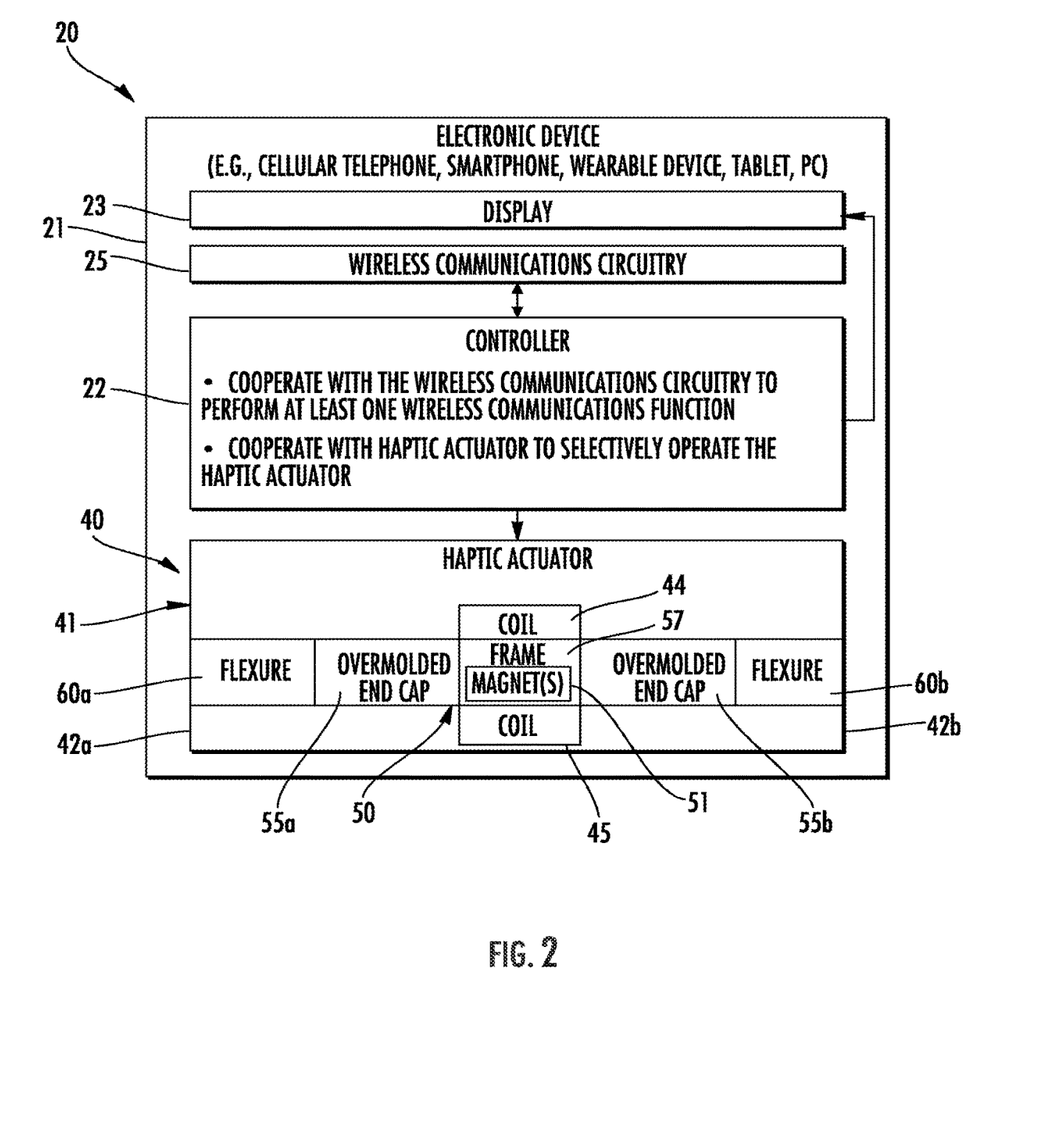
FIG. 2 is a schematic block diagram of the electronic device of FIG. 1.
Figure 3:
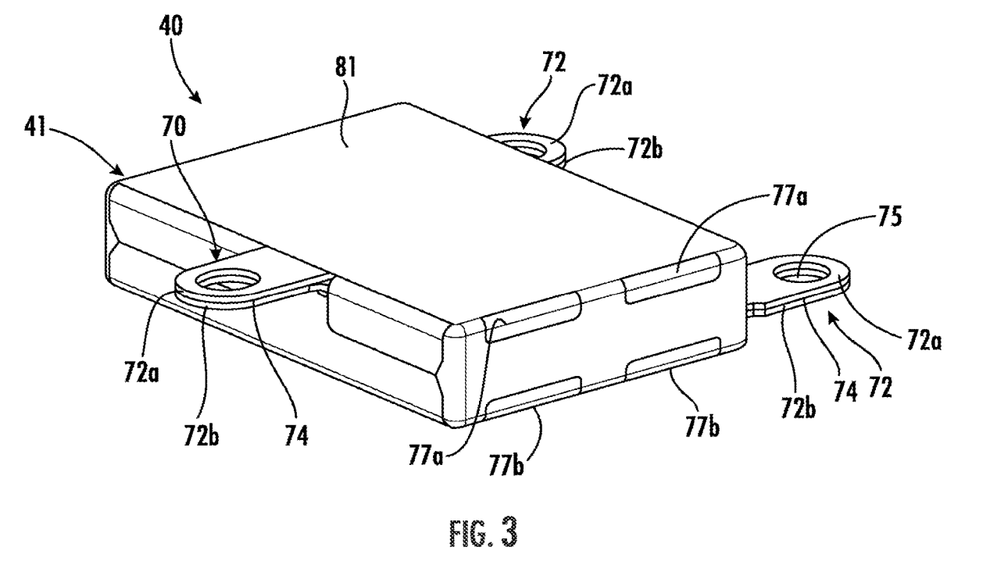
FIG. 3 is a perspective view of an exemplary haptic actuator in accordance with an embodiment.
Figure 4:
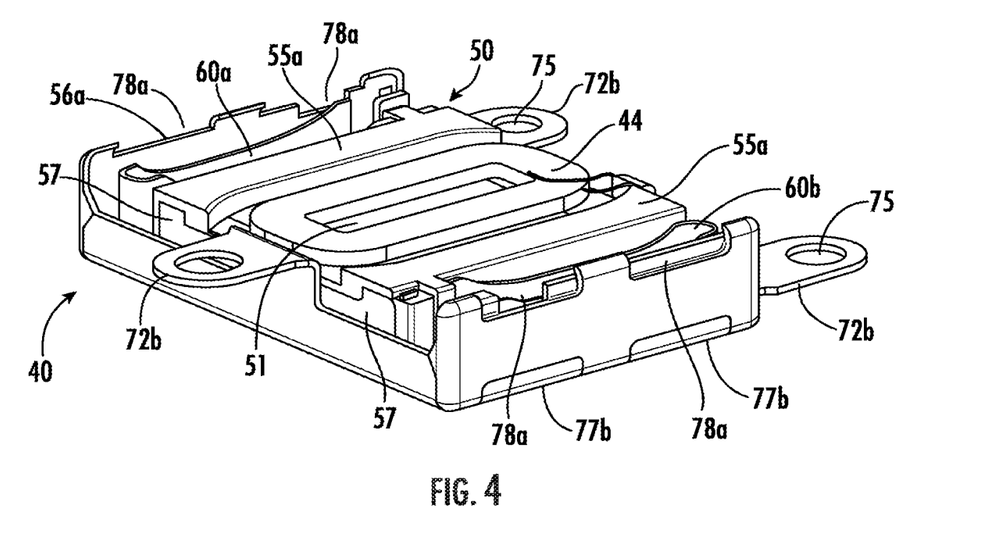
FIG. 4 is a perspective view of the haptic actuator of FIG. 3 with the first shell of the actuator housing removed.
Figure 5:
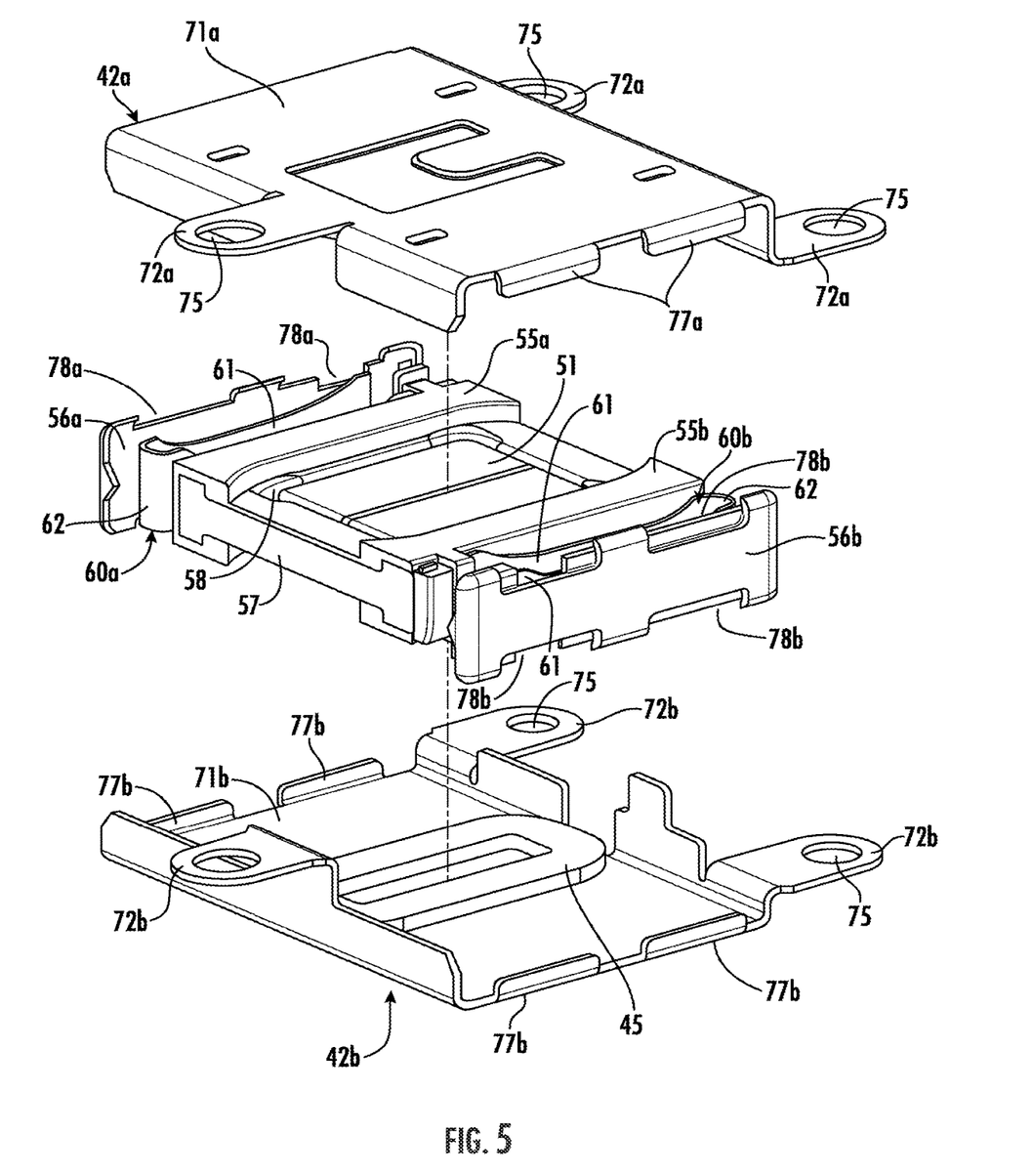
FIG. 5 is an exploded perspective view of a portion of a haptic actuator in accordance with an embodiment.

Referring initially to FIGS. 1-2, an electronic device 20 illustratively includes a device housing 21 and a controller 22 carried by the device housing. The electronic device 20 is illustratively a mobile wireless communications device, for example, a cellular telephone or smartphone. The electronic device 20 may be another type of electronic device, for example, a wearable device (e.g., a watch), a tablet computer, a laptop computer, a gaming device, etc.

Wireless communications circuitry 25 (e.g. cellular, WLAN Bluetooth, etc.) is also carried within the device housing 21 and coupled to the controller 22. The wireless communications circuitry 25 cooperates with the controller 22 to perform at least one wireless communications function, for example, for voice and/or data. In some embodiments, the electronic device 20 may not include wireless communications circuitry 25.

A display 23 is also carried by the device housing 21 and is coupled to the controller 22. The display 23 may be, for example, a light emitting diode (LED) display, a liquid crystal display (LCD), or may be another type of display, as will be appreciated by those skilled in the art. The display 23 may be a touch display and may cooperate with the controller 22 to perform a device function in response to operation thereof. For example, a device function may include a powering on or off of the electronic device 20, initiating communication via the wireless communications circuitry 25, and/or performing a menu function.

The electronic device 20 illustratively includes a haptic actuator 40. The haptic actuator 40 is coupled to the controller 22 and provides haptic feedback or a haptic effect to the user in the form of relatively long and short vibrations. The vibrations may be indicative of a message received, and the duration and type of the vibration may be indicative of the type of message received. Of course, the vibrations may be indicative of or convey other types of information.

While a controller 22 is described, it should be understood that the controller 22 may include one or more of a processor and other circuitry to perform the functions described herein. For example, the controller 22 may include a class-D amplifier to drive the haptic actuator 40 and/or sensors for sensing voltage and current.

Referring now additionally to FIGS. 3-8, the haptic actuator 40 includes an actuator housing 41 that may be metal, for example, and more particularly, may include a magnetic material. The actuator housing 41 may be another type of material or include more than one type of material.

The actuator housing 41 includes first and second shells 42a, 42b that are coupled together. The first shell 42a includes a first body 71a and first terminals 72a that extend outwardly from the first body. The first shell 42a also includes first tabs 77a extending from the first body 71a. A cosmetic label 81 may be carried by the first shell.

The second shell 42b includes a second body 71b and second terminals 72b that extend outwardly from the second body. The second shell 42b also includes second tabs 77b extending from the second body 71b.

The first tabs 77a each define a respective gap with each of the second tabs 77b. The first and second tabs 77a, 77b each have a curved shape to define a rounded edge.

Each of the second terminals 72b is secured with a respective one of the first terminals 72a defining pairs of first and second secured-together terminals 72. Each of the first and second terminals 72a, 72b has a fastener receiving passageway 75 therein. A respective fastener passes through each fastener receiving passageway 75 to fasten the haptic actuator 40 within the device housing 21, and more particularly, adjacent the display 23.

The first and second terminals 72a, 72b of each pair of secured-together terminals 72 are coextensive. A respective welded joint 74 secures each pair of first and second-secured together terminals 72.

The haptic actuator 40 also includes first and second coils 44, 45 carried by the actuator housing 41, for example, the top and the bottom, respectively. The first and second coils 44, 45 may each have a loop shape or "racetrack" shape and are aligned in a stacked relation and spaced apart. There may be any number of first and second coils 44, 45 as will be appreciated by those skilled in the art. The haptic actuator 40 also includes a field member 50 that is movable within the actuator housing 41 responsive to the first and second coils 44, 45.

The field member 50 includes a frame 57 that defines a mass. The frame 57 has opposing first and second ends 53a, 53b. The frame 57 may be metal, for example, tungsten or tungsten powder. The frame 57 may be a different material (e.g., relatively heavy material). The frame 57 illustratively includes cleating 54 at the opposing ends 53a, 53b. Cleating 54 may be included in other areas, for example, relatively high-stress areas.

The field member 50 also includes permanent magnets 51 carried by the frame 57 and between the first and second coils 44, 45. More particularly, the permanent magnets 51 are configured in side-by-side relation and carried within a respective magnet receiving opening 64. An overmolded magnet receiving holder 58 is coupled to the frame 57 and lines corners of the magnet receiving opening 64 to receive the permanent magnets 51 therein. The permanent magnets 51 may be press-fitted to a magnetic center to reduce or minimize magnetic flux bias, as will be appreciated by those skilled in the art.

The permanent magnets 51 may be neodymium, for example, and may be positioned in opposing directions with respect to their respective poles. There may be any number of permanent magnets 51 having any shape between the first and second coils 44, 45. In some embodiments, the coils 44, 45 may be carried by the field member 50 and the permanent magnets 51 carried by the housing (i.e., movable coils).

The field member 50 illustratively includes a first overmolded endcap 55a coupled to the first end 53a of the frame 57. More particularly, the first end 53a of the frame 57 (e.g., the cleating 54) is embedded into the first overmolded endcap 55a. The first overmolded endcap 55a may be plastic, such as a thermosetting or thermoplastic material. The first overmolded endcap 55a may be another material or may include additional materials. For example, tungsten powder (to increase the weight) or glass (to increase the strength) may be included within the first overmolded endcap 55a.

A second overmolded endcap 55b is coupled to the second end 53b of the frame 57. More particularly, similarly to the first end 53a, the second end 53b of the frame 57 (e.g., the cleating 54) is embedded into the second overmolded endcap 55b. The second overmolded endcap 55b may be plastic. The second overmolded endcap 55b may be another material or may include additional materials. For example, tungsten powder or glass may be included within the second overmolded endcap 55b.

The haptic actuator 40 also includes a first flexure 60a having an inner end coupled to, for example, embedded into, the first overmolded endcap 55a. The first flexure 60a also has an outer end coupled to adjacent portions of the actuator housing 41. More particularly, a first plastic body 56a is coupled to the outer end of the first flexure 60a and carried by the actuator housing 41. The outer end of the first flexure 60a is embedded within the first plastic body 56a.

More particularly, the first plastic body 56a has recesses 78a, 78b therein to receive the corresponding first and second tabs 77a, 77b therein. The first plastic body 56a fills the respective gap defined by the first and second tabs 77a, 77b. The first plastic body 56a also has a curved shape to define, with respective first and second tabs 77a, 77b, the rounded edges.

Figure 7:
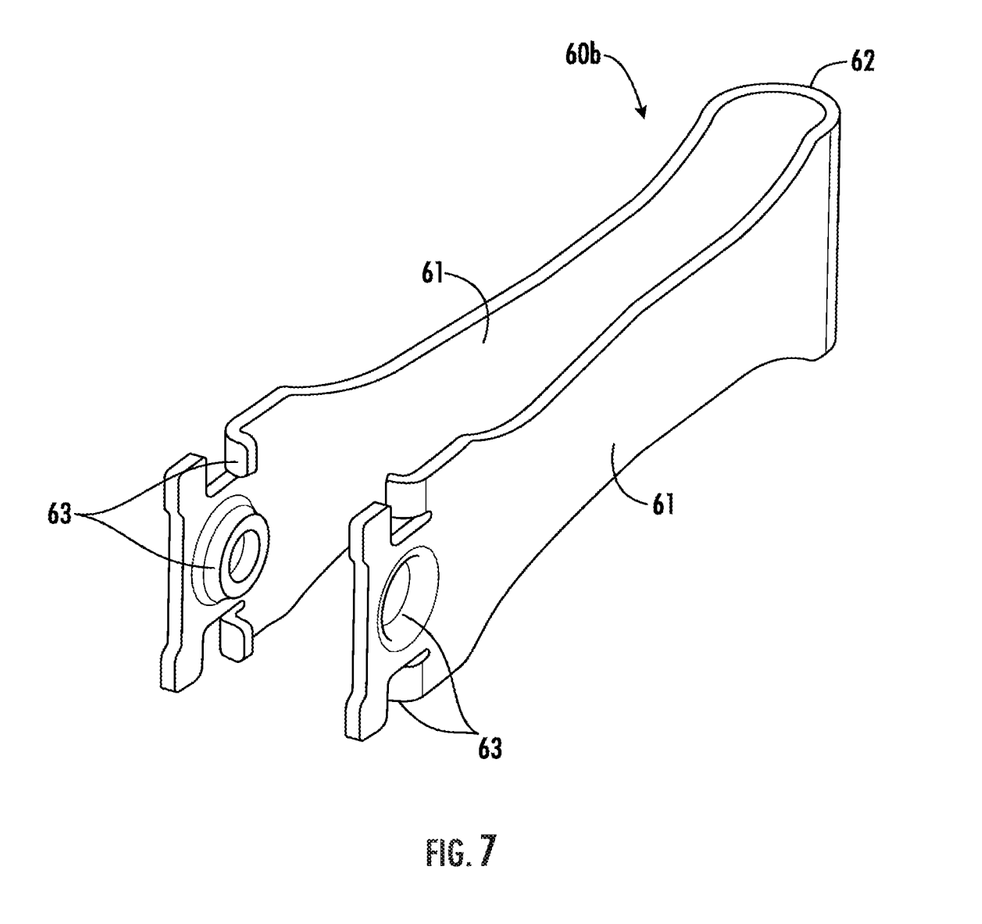
FIG. 7 is a perspective view of a flexure of a haptic actuator in accordance with an embodiment.
Figure 8:
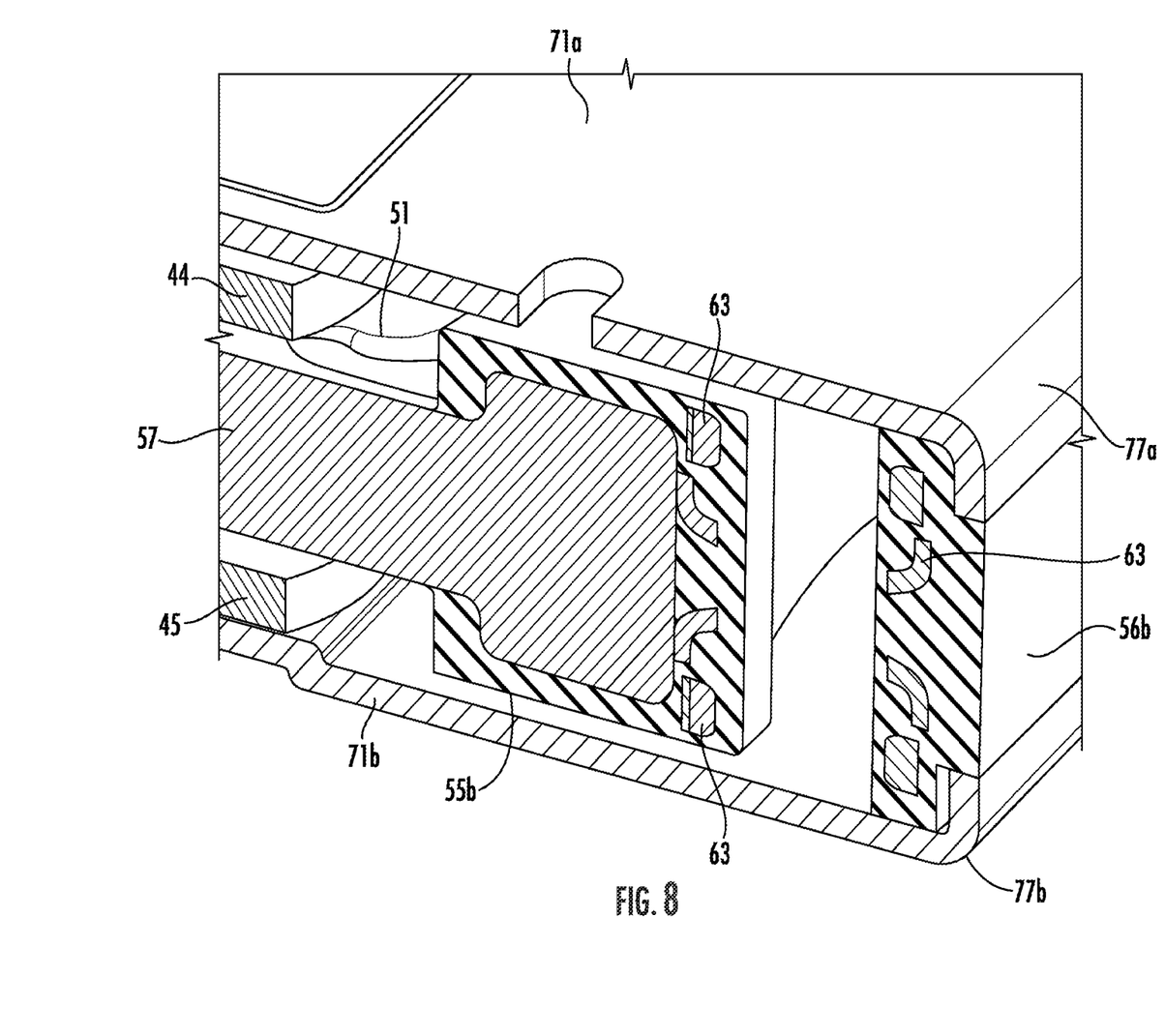
FIG. 8 is a cut-away view of a portion of a haptic actuator in accordance with an embodiment.

The first flexure 60a illustratively includes two diverging arms 61 joined together by a bend 62 defining a wishbone shape. The two diverging arms 61 have cleating 63 or surface features at distal ends opposite the bend 62. The cleating 63 is illustratively encapsulated by the first plastic body 56a and the first overmolded endcap 55a. The first flexure 60a may be metal, for example. Of course, the first flexure 60a may be another material or may include other and/or additional materials. While a single first flexure 60a is illustrated, there may be more than one first flexure.

The haptic actuator 40 also includes a second flexure 60b having an inner end coupled to, for example, embedded into, the second overmolded endcap 55b. The second flexure 60b also has an outer end coupled to adjacent portions of the actuator housing 41. More particularly, a second plastic body 56b is coupled to the outer end of the second flexure 60b and carried by the actuator housing 41. The outer end of the second flexure 60b is embedded within the second plastic body 56b.

More particularly, the second plastic body 56b has recesses 78a, 78b therein to receive the corresponding first and second tabs 77a, 77b therein. The second plastic body 56b fills the respective gap defined by the first and second tabs 77a, 77b. The second plastic body 56b also has a curved shape to define, with respective first and second tabs 77a, 77b, the rounded edges.

The second flexure 60b, similarly to the first flexure 60a, illustratively includes two diverging arms 61 joined together by a bend 62 to define a wishbone shape. The two diverging arms 61 have cleating 63 at distal ends opposite the bend 62. The cleating 63 is illustratively encapsulated by the second plastic body 56b and the second overmolded endcap 55b. The second flexure 60b may be metal, for example. Of course, the second flexure 60b may be another material or may include other and/or additional materials. While a single second flexure 60b is illustrated, there may be more than one second flexure.

As will be appreciated by those skilled in the art, the haptic actuator 40 described herein may include a reduced part count, and may include reduced welding, gluing, and inspection operations relative to prior art haptic actuators, for example, by reducing and combining processes. Additionally, complexity of docking or mounting the field member 50 and flexures 60a, 60b within the actuator housing 41, may be reduced as the molded components may be considered self-aligning. With respect to volume efficiency, as described above, for example, mold features and tungsten powder compounding may be utilized to increase material volume and shapes. The use of compound materials and mold strategic shapes/locations of the haptic actuator 40 may also optimize resonance and damping characteristics.

With respect to drop shock, flexure breakage may be reduced since overmolding is typically done at lower temperatures relative to welding, for example. Moreover, the materials and shapes may be chosen to define moldable shock tolerant features, for example, crash stops.

In some embodiments, the frame 57 may be entirely plastic. For example, the frame 57, as being entirely plastic, may be integrally molded with the first and second overmolded endcaps 55a, 55b. Other and/or additional components may also be plastic and integrally molded with the fully plastic frame 57.

Figure 6:
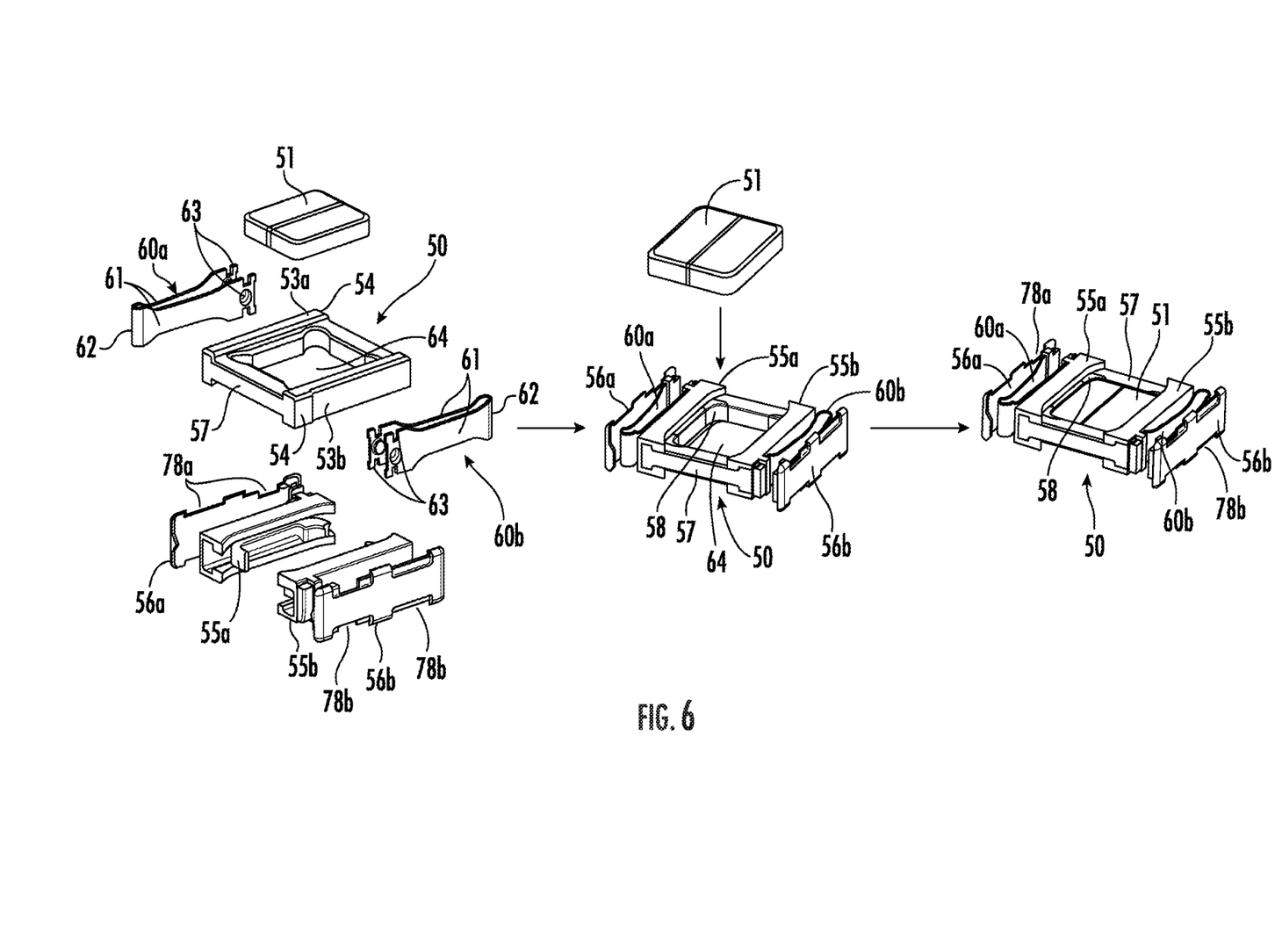
FIG. 6 illustrates assembly of an exemplary haptic actuator in accordance with an embodiment.

A method aspect is directed to a method of making a haptic actuator 40. The method includes coupling first and second shells 42a, 42b of a housing 41 together. The first shell 42a includes a first body 71a and a first plurality of terminals 72a extending outwardly therefrom. The second shell 42b includes a second body 71b and a second plurality of terminals 72b extending outwardly therefrom. The first and second shells 42a, 42b are coupled so that each of the second plurality of terminals 72b being secured with a respective one of the first plurality of terminals 72a define pairs of first and second secured-together terminals 72. The method also includes positioning at least one coil 44 carried by the housing 41 and positioning a field member 50 to be movable within the housing responsive to the at least one coil. The method further includes positioning a respective flexure 60a, 60b between adjacent end portions of the housing 41 and the field member 50.

Another method aspect is directed to a method of making a haptic actuator 40. The method includes coupling first and second shells 42a, 42b of a housing 41 together. The first shell 42a includes a first body 71a and a first plurality of tabs 77a extending therefrom. The second shell 42b includes a second body 71b and a second plurality of tabs 77b extending therefrom. The method includes positioning at least one coil 44 carried by the housing 41 and positioning a field member 50 to be movable within the housing responsive to the at least one coil. The method also includes positioning a respective flexure 60a, 60b between adjacent end portions of the housing 41 and the field member 50. Each flexure 60a, 60b includes a plastic body 56a, 56b having a plurality of recesses 78a, 78b therein to receive corresponding ones the first and second pluralities of tabs 77a, 77b therein.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

What is claimed is:

1. A haptic actuator, comprising:
a housing including,
   a first shell defining a first tab;
   a second shell defining a second tab; and
   a plastic end portion positioned between the first and second shells and defining recesses, the recesses receiving the first and second tabs;
at least one electric coil carried by the housing;
a field member movable within the housing responsive to the at least one electric coil; and
a flexure coupled to the plastic end portion and the field member.

2. The haptic actuator of claim 1, wherein:
the first shell further defines a third tab and a first depression between the first and the third tabs;
the second shell further defines a fourth tab and a second depression between the second and the fourth tabs; and
the plastic end portion fills the first and the second depression.

3. The haptic actuator of claim 1, wherein:
the first and second tabs have a curved shape that defines respective rounded edges; and
the recesses receiving the first and second tabs have curved shapes corresponding to the curved shape of respective first and second tabs.

4. The haptic actuator of claim 1, wherein the flexure comprises a pair of diverging arms.

5. The haptic actuator of claim 4, wherein:
the flexure is a first flexure and the pair of diverging arms is a first pair of diverging arms;
the haptic actuator further comprises a second flexure comprising a second pair of diverging arms;
a free end of a first arm of the first pair of diverging arms is coupled to a first side of the field member; and
a free end of a second arm of the second pair of diverging arms is coupled to a second side of the field member, the second side opposite the first side.

6. The haptic actuator of claim 1, wherein the field member comprises a frame and at least one magnet carried by the frame.

7. The haptic actuator of claim 1, wherein:
the flexure comprises a pair of arms diverging from each other at a first end of the flexure;
at the first end, a first arm of the pair of arms extends through a sidewall of the plastic end portion; and
at the first end, a second arm of the pair of arms extends through a portion of the field member.

8. The haptic actuator of claim 7, wherein the portion of the field member comprises plastic.

9. An electronic device, comprising:
a device housing;
wireless communications circuitry carried by the device housing;
a haptic actuator carried by the device housing and including:
an actuator housing including:
a first shell comprising a first tab;
a second shell coupled to the first shell and comprising a second tab;
an end portion defining a first recess corresponding to the first tab and a second recess corresponding to the second tab;
at least one electric coil carried by the actuator housing;
a field member movable within the actuator housing responsive to the at least one electric coil; and
a flexure coupled to the end portion and the field member, a portion of the end portion overmolded over a first portion of the flexure and a portion of the field member overmolded over a second portion of the flexure; and
a controller coupled to the wireless communications circuitry and the haptic actuator and configured to perform at least one wireless communications function and selectively operate the haptic actuator, respectively.

10. The electronic device of claim 9, wherein the actuator housing comprises a magnetic material.

11. The electronic device of claim 9, wherein:
the flexure is a first flexure;
the first flexure is coupled to a first side of the field member;
the haptic actuator further includes a second flexure coupled to a second side of the field member, the second side opposite the first side;
the first flexure is configured to restrict movement of the field member in a first direction; and
the second flexure is configured to restrict movement of the field member in a second direction opposed to the first direction.

12. The electronic device of claim 9, wherein the first portion of the flexure and the second portion of the flexure are respective distal ends of a pair of diverging arms defining a wishbone shape.

13. The electronic device of claim 9, wherein:
the first shell defines a first terminal extending outward from the electronic device;
the second shell defines a second terminal extending outward from the electronic device; and
the electronic device further comprises a fastener securing the first terminal to the second terminal.

14. A haptic actuator, comprising:
a housing including,
a first shell portion;
a second shell portion; and
an end portion extending between the first shell portion to the second shell portion;
at least one electric coil carried by the housing;
a field member movable within the housing responsive to the at least one electric coil and including a plastic endcap; and
a flexure having a first end embedded in the plastic endcap and a second end coupled to the end portion.

15. The haptic actuator of claim 14, wherein:
the plastic endcap is overmolded on the first end of the flexure; and
the end portion is overmolded on the second end of the flexure.

16. The haptic actuator of claim 15, wherein each of the first and second ends of the flexure define a respective curved end interlocked with the plastic endcap and the end portion, respectively.

17. The haptic actuator of claim 14, wherein:
the field member comprises a frame coupled to the plastic endcap; and
the frame includes a permanent magnet that moves responsive to the at least one electric coil.

18. The haptic actuator of claim 14, wherein the end portion comprises a shell that interlocks with the first and second shell portions.

19. The haptic actuator of claim 14, wherein the end portion is plastic and the flexure is metal.

20. The haptic actuator of claim 14, wherein the flexure is a first flexure and the haptic actuator further comprises a second flexure coupled to an opposite end of the field member.

* * * * *